(12) United States Patent
Kim et al.

(10) Patent No.: US 7,579,110 B2
(45) Date of Patent: Aug. 25, 2009

(54) SECONDARY LITHIUM BATTERY MODULE

(75) Inventors: Jee Ho Kim, Daejeon (KR); Hyun Suk Choo, Seoul (KR); Ji Sang Yu, Daejeon (KR)

(73) Assignee: LG Chem, Ltd. (KR)

( * ) Notice: Subject to any disclaimer, the term of this patent is extended or adjusted under 35 U.S.C. 154(b) by 890 days.

(21) Appl. No.: 10/548,937

(22) PCT Filed: Mar. 11, 2004

(86) PCT No.: PCT/KR2004/000498

§ 371 (c)(1),
(2), (4) Date: Sep. 12, 2005

(87) PCT Pub. No.: WO2004/082044

PCT Pub. Date: Sep. 23, 2004

(65) Prior Publication Data

US 2006/0197500 A1    Sep. 7, 2006

(30) Foreign Application Priority Data

Mar. 13, 2003  (KR) .................. 10-2003-0015848

(51) Int. Cl.
*H01M 2/02*    (2006.01)
(52) U.S. Cl. ................... 429/178; 429/211; 429/163; 429/209
(58) Field of Classification Search ............ None
See application file for complete search history.

(56) References Cited

U.S. PATENT DOCUMENTS 3,841,915 A  * 10/1974  Eberle .................. 429/160
6,242,128 B1 *  6/2001  Tura et al. .............. 429/161

FOREIGN PATENT DOCUMENTS

| JP | 8-96838 | 4/1996 |
|----|---------|--------|
| JP | 9-92238 | 4/1997 |
| JP | 11-176396 | 7/1999 |
| KR | 2002-0012397 | 2/2002 |
| KR | 1020020012397 | 2/2002 |

OTHER PUBLICATIONS

PCT International Search Report; International Application No. PCT/KR2004/000498; International Filing Date: Mar. 11, 2004; Date of Mailing: Jun. 23, 2004.

* cited by examiner

*Primary Examiner*—Patrick Ryan
*Assistant Examiner*—Cynthia Lee
(74) *Attorney, Agent, or Firm*—Cantor Colburn LLP

(57) ABSTRACT

Disclosed is a secondary lithium battery module. The secondary lithium battery module comprising a plurality of secondary lithium unit-batteries including anode and cathode terminals having a hole, which terminals are protruded in one direction in parallel to each other and alternately aligned; a receiving module having a plurality of non-metallic receiving unit-modules, each unit-module having recesses for receiving the anode and cathode terminals of the secondary lithium unit-batteries therein, each recess having a fixing hole; a metal block having a fixing hole and a contact plate and aligned in the recesses of the receiving unit-modules such that the metal block makes contact with at least one of the anode and cathode terminals of the secondary lithium unit-batteries accommodated in the recesses of the receiving unit-modules; a circuit board having a shape corresponding to a shape of the receiving module and aligned on an upper surface of the receiving module, the circuit board having recesses corresponding to the recesses of the receiving module and copper wirings formed at lateral portions of the recesses in order to make contact with the contact plate of the metal block; and a coupling member inserted into the recesses of the receiving module, the anode and cathode terminals of the secondary lithium unit-batteries accommodated in the recesses, and the fixing hole of the metal block making contact with at least one of the anode and cathode terminals so as to fixedly assemble the receiving module, secondary lithium unit-batteries and the metal block with each other.

12 Claims, 4 Drawing Sheets

SECONDARY LITHIUM BATTERY MODULE

TECHNICAL FIELD

The present invention relates to a battery module or a battery pack used in electric vehicles or electric bicycles, and more particularly to a secondary lithium battery module in which secondary lithium unit-batteries having outer cases in the form of Al laminated films are connected to each other in series.

The present invention relates to a secondary lithium battery module or a battery pack suitable for a system, such as an electric vehicle, requiring high capacity and high voltage, in which anode terminals and cathode terminals of secondary lithium unit-batteries protruding to an exterior are connected to each other by means of a metal block, such as an aluminum block, so that heat generated in the secondary lithium unit-batteries are rapidly discharged to the exterior, thereby minimizing a temperature deviation between the secondary lithium unit-batteries, and preventing degradation of the secondary lithium unit-batteries caused by the temperature deviation between the secondary lithium unit-batteries while expanding a life span of the secondary lithium unit-batteries, and in which a circuit board is used for measuring voltage of each secondary lithium unit-battery, thereby minimizing a volume of the secondary lithium battery module and improving energy density of the secondary lithium battery module.

Background Art

Currently, as generally known in the art, electric vehicles have been proposed in order to solve environmental problems caused by motor vehicles equipped with an internal combustion engine. Such an electric vehicle does not generate exhaust gas. That is, the electric vehicle does not produce driving force by using a combustion action of fuel, but produce driving force by means of electric power supplied from batteries, so the electric vehicle does not generate exhaust gas. Accordingly, the batteries are essentially required for the electric vehicle so as to provide driving force to the electric vehicle, so the performance of the batteries becomes a very important factor for allowing the electric vehicle to have the sufficient fuel efficiency and driving power similar to those of a gasoline vehicle.

The fuel efficiency of the electric vehicle may depend on total energy of batteries installed in the electric vehicle and such total energy is determined based on capacity and voltage of the batteries installed in the electric vehicle. The electric vehicle has a limited space for a battery mounting section and the batteries may take up a relatively great portion with respect to a total weight of the electric vehicle, so electric energy per a unit volume and per a unit weight of the battery may become an important factor for the electric vehicle. For this reason, currently, secondary lithium batteries for electric vehicles having high energy density have been actively developed. Since the electric vehicle requires high capacity of the batteries as well as high voltage of the batteries, the batteries must be designed in such a manner that they can be easily managed and easily connected to each other for providing high voltage.

Generally, voltage and capacity of one unit battery capable of charging or discharging electricity are very low, so it is necessary to provide high voltage and high capacity by forming a battery module comprising a plurality of unit batteries in order to satisfy voltage and capacity required for the electric vehicle.

A Ni-MH battery, which is widely used as a battery for the electric vehicle, has a battery case generally made of stainless steel. In addition, a bolt and a nut are provided to connect Ni-MH batteries to each other. The Ni-MH battery uses an aqueous electrolyte, so gas is generated in the Ni-MH battery. Accordingly, the battery case of the Ni-MH battery must be designed such that the battery case can endure internal pressure of the Ni-MH battery. For this reason, a metal can made of stainless steel is used for the battery case of the Ni-MH battery. Such stainless steel may be disadvantageous because it takes 20% with respect to a total weight percent of the battery. However, in a case of a secondary lithium battery having a battery case made of an Al laminated film, the weight percent of the battery case can be reduced to 5% with respect to the total weight percent of the secondary lithium battery. Thus, the secondary lithium battery is very advantageous for storing energy per a unit weight.

However, since the secondary lithium battery does not use the metal can, it is difficult to connect secondary lithium batteries to each other when forming a battery module or a battery pack. Special matters to be considered when forming the battery module or the battery pack in order to optimize the performance of the batteries are that contact resistance for a connection between batteries must be minimized, a volume and a weight of the battery pack or battery module must be reduced, and heat generated from the battery must be rapidly exhausted to an exterior.

Korean Patent Laid-open Publication No. 2002-0012397 discloses a secondary lithium battery and a secondary lithium battery module capable of minimizing a volume thereof. However, according to Korean Patent Laid-open Publication No. 2002-0012397, secondary lithium batteries are simply connected to each other. For this reason, an incomplete connection occurs between secondary lithium batteries, so that contact resistance may be significantly increased. In addition, an anode terminal and a cathode terminal of the secondary lithium battery are bent twice, so the secondary lithium unit battery may be damaged. Furthermore, although a position and a space for installing the battery module or the battery pack are limited, the secondary lithium battery and the secondary lithium battery module are not adaptable for various applications.

DISCLOSURE OF THE INVENTION

Therefore, the present invention has been made in view of the above-mentioned problems, and it is an object of the present invention to provide a secondary lithium battery module capable of reducing a volume and a weight thereof while minimizing contact resistance caused by an incomplete connection between secondary lithium batteries and capable of rapidly exhausting heat generated from the secondary lithium batteries to an exterior, thereby increasing energy density and preventing degradation of the secondary lithium battery module caused by temperature deviation between the secondary lithium batteries.

In order to accomplish the above object, there is provided a secondary lithium battery module comprising: a plurality of secondary lithium unit-batteries including anode and cathode terminals having a hole, which terminals are protruded in one direction in parallel to each other and alternately aligned; a receiving module having a plurality of non-metallic receiving unit-modules, each unit-module having recesses for receiving the anode and cathode terminals of the secondary lithium unit-batteries therein, each recess having a fixing hole; a metal block having a fixing hole and a contact plate and aligned in the recesses of the receiving unit-modules such that the metal block makes contact with at least one of the anode and cathode terminals of the secondary lithium unit-batteries accommodated in the recesses of the receiving unit-modules; a circuit board having a shape corresponding to a shape of the receiving module and aligned on an upper surface of the receiving module, the circuit board having recesses corresponding to the recesses of the receiving module and copper wirings formed at lateral portions of the recesses in order to make contact with the contact plate of the metal block; and a coupling member inserted into the recesses of the receiving module, the anode and cathode terminals of the secondary lithium unit-batteries accommodated in the recesses, and the fixing hole of the metal block making contact with at least one of the anode and cathode terminals so as to fixedly assemble the receiving module, secondary lithium unit-batteries and the metal block with each other.

According to an exemplary embodiment of the present invention, the receiving unit-module has two recesses opened in opposition to each other for receiving the anode and cathode terminals of the secondary lithium unit-battery, respectively, and a receiving hole is formed in the receiving module by a connection between the neighboring recesses of the neighboring receiving unit-modules coupled to each other when the receiving unit-module is coupled to an adjacent one.

According to an exemplary embodiment of the present invention, a width of the secondary lithium unit-battery is substantially identical to a width of the receiving unit-module and a width of the receiving hole defined in the receiving module by a connection between the neighboring recesses of the neighboring receiving unit-modules.

According to an exemplary embodiment of the present invention, the metal block is composed of one selected from the group consisting of copper, aluminum, a copper alloy and an aluminum alloy.

According to an exemplary embodiment of the present invention, the coupling member includes a non-metallic bolt member.

According to an exemplary embodiment of the present invention, the contact plate protruding from the metal block is welded to the copper wirings of the circuit board.

According to an exemplary embodiment of the present invention, the contact plate protruding from the metal block is fixed to the copper wirings of the circuit board by means of a clamp.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention.

Hereinafter, a preferred embodiment of the present invention will be described with reference to accompanying drawings.

A secondary lithium battery module according to the present invention includes a plurality of secondary lithium unit-batteries having anode terminals and cathode terminals, a receiving module for receiving the anode terminals and the cathode terminals of the secondary lithium unit-batteries, metal blocks positioned between the anode terminals and the cathode terminals so as to electrically connect the anode terminals to the cathode terminals in series, a circuit board making contact with a part of the metal blocks so as to measure quantity of electricity in the secondary lithium unit-batteries, and a coupling member for stably fixing the anode terminals and cathode terminals of the secondary lithium unit-batteries, the receiving unit-modules and the metal blocks.

Figure 1A:
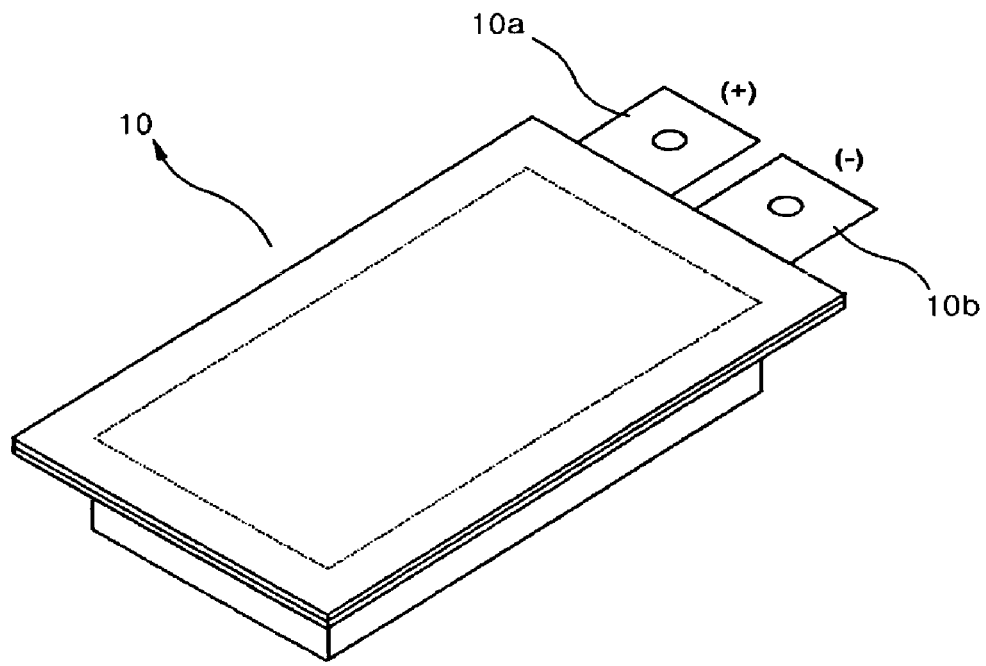
FIGS. 1a and 1b are perspective views showing secondary lithium unit-batteries, respectively.
Figure 1B:
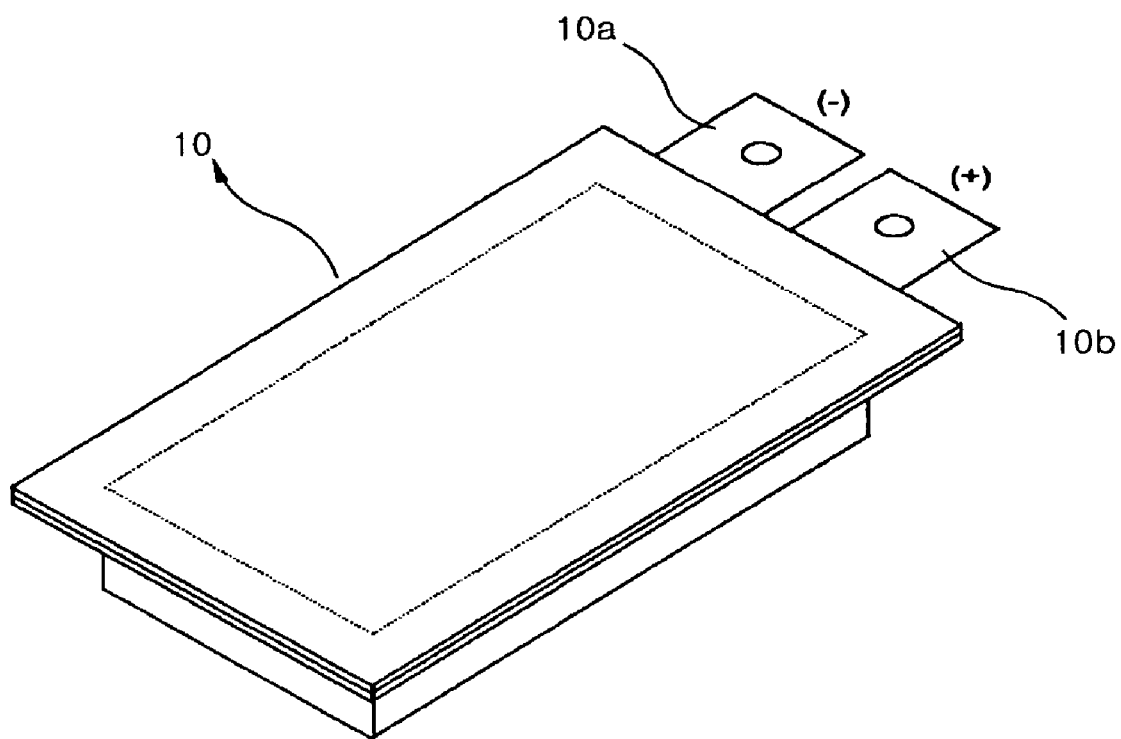

FIGS. 1a and 1b are perspective views showing the secondary lithium unit-batteries, respectively.

Referring to FIGS. 1a and 1b, as generally known in the art, each of the secondary lithium unit-batteries 10 includes an electrode assembly having an anode plate, a cathode plate, and a separator, a battery case for receiving the electrode assembly, and anode and cathode terminals 10a and 10b connected to the anode and cathode plates and protruded to an exterior, respectively. The anode and cathode terminals 10a and 10b protrude in the same direction in parallel to each other and formed with a fixing hole, respectively. The receiving module, which is made of a non-metallic material and receives the anode and cathode terminals 10a and 10b of the secondary lithium unit-battery 10, includes a plurality of receiving unit-modules as shown in FIG. 2a.

Figure 2A:
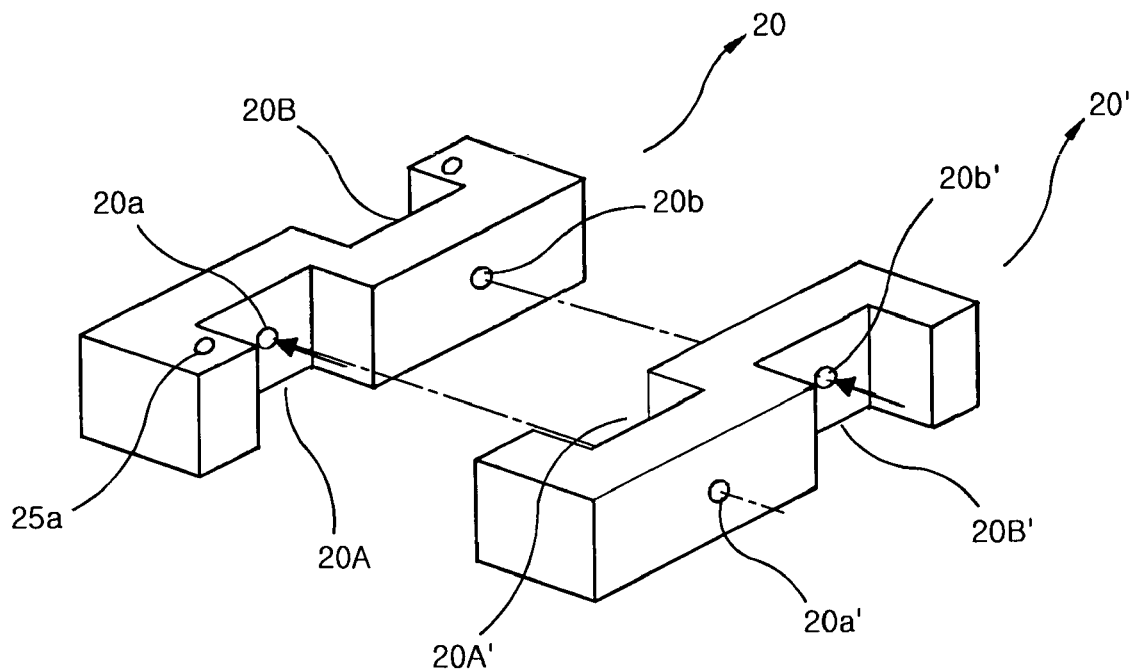
FIG. 2a is a perspective view showing receiving unit-modules and a coupling relationship between receiving unit-modules forming a part of a secondary lithium battery module according to a preferred embodiment of the present invention.

FIG. 2a is a perspective view showing the receiving unit-modules and a coupling relationship between the receiving unit-modules forming a part of the secondary lithium battery module according to the present invention.

The receiving unit-module 20 has recesses 20A and 20B and the receiving unit-module 20' has recesses 20A' and 20B' for receiving anode and cathode terminals 10a and 10b of the secondary lithium unit-batteries 10. The recesses 20A, 20B, 20A' and 20B' are formed with fixing holes 20a, 20b, 20a' and 20b', respectively.

Recesses of each receiving unit-module 20 and receiving unit-module 20' are opened in opposition to each other. As shown in FIG. 2a as an arrow, receiving unit-modules 20 and 20', which are adjacent to each other, make contact with each other in such a manner that the recess of the receiving unit-module 20 may match with the recess of the receiving unit-module 20', so that a receiving hole is defined in the receiving module by two neighboring recesses when the neighboring receiving unit-modules 20 and 20' are coupled to each other.

The anode and cathode terminals 10a and 10b of the secondary lithium unit-batteries 10 may be received in the recesses of the receiving unit-modules. For instance, the anode and cathode terminals of one secondary lithium unit-battery are received in the recesses 20A and 20B of the receiving unit-module 20, respectively, and the cathode and anode terminals of the other secondary lithium unit-battery are received in the recesses 20A' and 20B' of the receiving unit-module 20', respectively.

Fixing holes 25a are formed at both sides of an upper surface of each receiving unit-module so as to receive a part of the metal block.

The receiving unit-module or the receiving module is made of a non-metallic material, which is an electric nonconductor. Preferably, the receiving unit-module or the receiving module is composed of plastic.

Each anode terminal and each cathode terminal of the secondary lithium unit-batteries, which are adjacent to each other, are positioned in the receiving hole defined by the neighboring recesses of the receiving unit-modules adjacent to each other. In this state, a metal block 30 is positioned between the anode terminals and cathode terminals of the secondary lithium unit-batteries so as to make contact with the anode terminals and the cathode terminals of the secondary lithium unit-batteries adjacent to each other.

The metal block 30 electrically connects the anode terminals or the cathode terminals of the secondary lithium unit-batteries with each other or electrically connects the anode terminals to the cathode terminals. The metal block is composed of one selected from the group consisting of copper, aluminum, a copper alloy and an aluminum alloy.

Figure 2B:
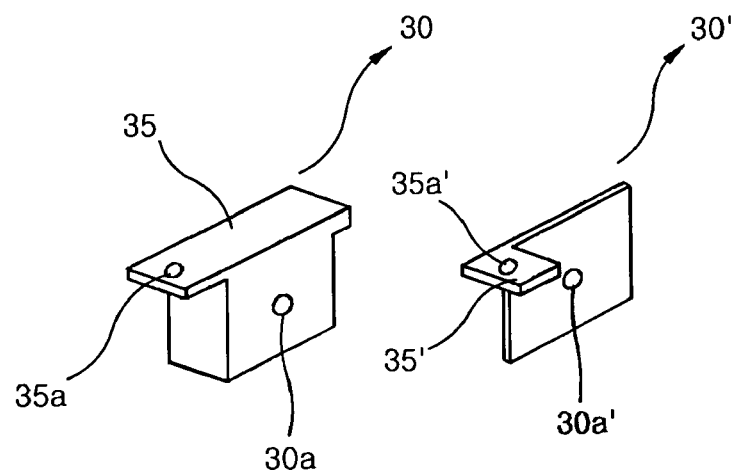
FIG. 2b is a perspective view showing metal blocks forming a part of a secondary lithium battery module according to a preferred embodiment of the present invention.

FIG. 2b shows the metal block 30 and a modified metal block 30' according to a preferred embodiment of the present invention.

The metal block 30 includes a body portion and a contact plate or a conductive plate 35 formed at an upper portion of the metal block 30 and protruded from the body portion. The body portion and the conductive plate 35 have fixing holes 30a and 35a, respectively.

Since only one recess is formed at both end parts of the receiving module defined by a plurality of receiving unit-modules coupled to each other, the modified metal block 30' may be provided in the recess formed at both end parts of the receiving module.

The modified metal block 30' may include a thin body portion and a bending-type contact or conductive plate 35' protruded from the thin body portion. The body portion and the conductive plate 35' have fixing holes 30a' and 35a', respectively.

Figure 2C:
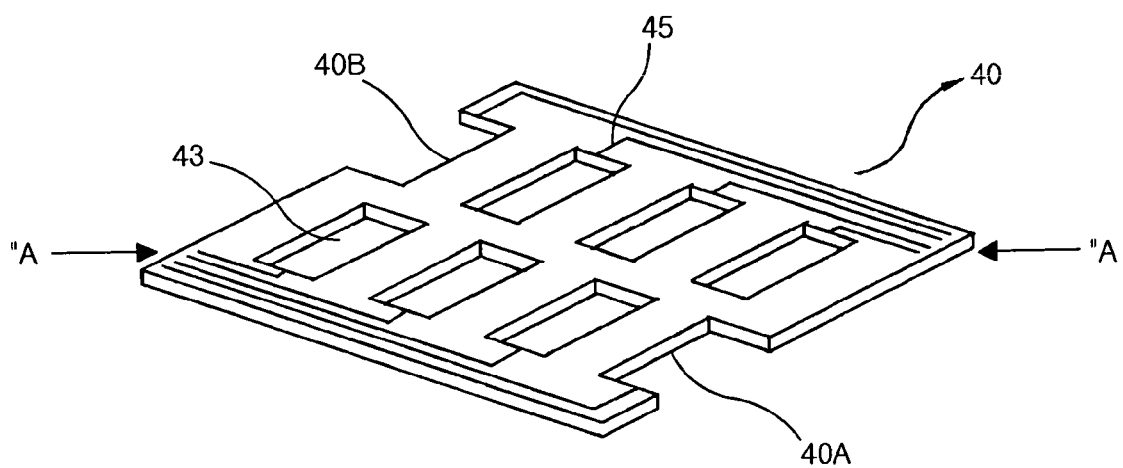
FIG. 2c is a perspective view showing a circuit board forming a part of a secondary lithium battery module according to a preferred embodiment of the present invention.

A circuit board 40 having a shape corresponding to a shape of the receiving module is installed on the receiving module. FIG. 2c is a perspective view showing a structure of the circuit board 40 according to a preferred embodiment of the present invention.

The circuit board 40 is connected to both anode terminals and cathode terminals of the secondary lithium unit-batteries so as to measure electric capacity, such as voltage of the secondary lithium unit-batteries.

Since the shape of the circuit board 40 corresponds to the shape of the receiving module formed by a plurality of receiving unit-modules, the circuit board 40 has a receiving hole 43 and recesses 45A and 45B corresponding to the receiving hole and recesses of the receiving module.

Copper wirings 45 are formed at lateral sides of the receiving hole 43 or the recesses 45A and 45B. Each of the copper wirings 45 is connected to a predetermined portion of the circuit board 40 (for example, an "A" part shown in FIG. 2c) so as to measure electric capacity of the secondary lithium battery by using devices, such as sockets.

In order to measure electric capacity of the secondary lithium battery, the conductive plates 35 and 35' of the metal blocks 30 and 30' make contact with the copper wirings 45. For the purpose of a stable connection between the conductive plates 35 and 35' and the copper wirings 45, the copper wirings 45 can be connected with the conductive plates 35 and 35' by coupling a clamp through the fixing holes 35a and 35a' of the conductive plates 35 and 35', or the copper wirings 45 can be welded to the conductive plates 35 and 35'.

Figure 2D:
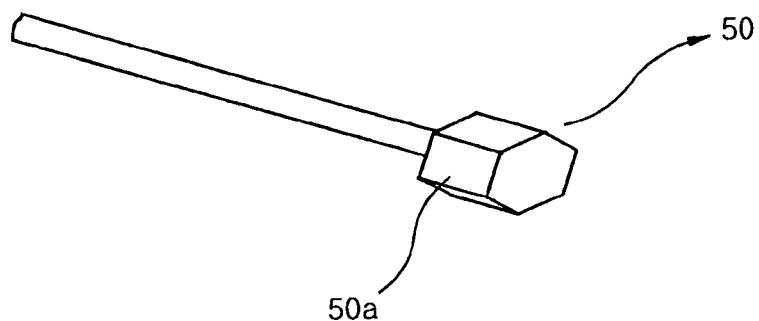
FIG. 2d is a perspective view showing a coupling member forming a part of a secondary lithium battery module according to a preferred embodiment of the present invention.

Main components of the secondary lithium battery module according to the present invention, such as the anode and cathode terminals 10a and 10b provided in each secondary lithium unit-battery, the receiving unit-modules 20 and 20' and the metal blocks 30 and 30', are fixedly assembled by means of a coupling member 50 as shown in FIG. 2d.

The coupling member 50 may include a bolt having a head 50a. The coupling member 50 is inserted into the fixing holes of the anode and cathode terminals 10a and 10b, fixing holes 20a, 20a', 20b, 20b' of the receiving module, and the fixing holes 30a and 30a' of the metal blocks 30 and 30' and is coupled with counter-coupling member, such as a nut, thereby forming an assembled secondary lithium battery module.

Figure 3:
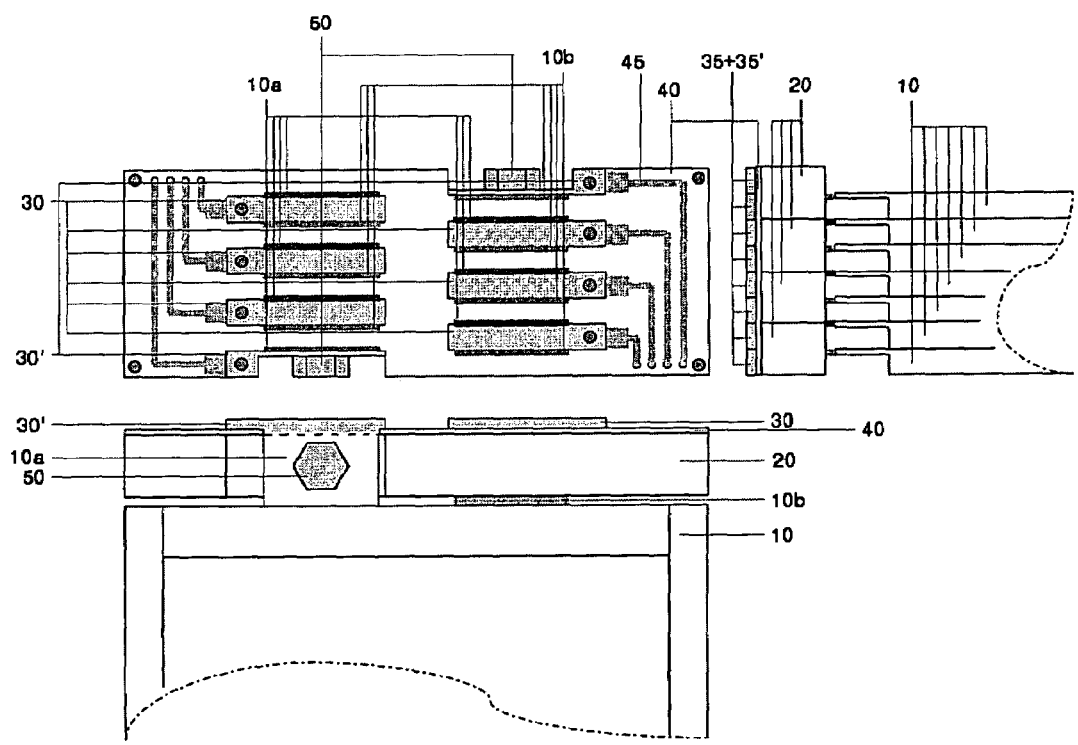
FIG. 3 shows front, plan and side views of an assembled secondary lithium battery module according to a preferred embodiment of the present invention.

FIG. 3 shows such an assembled secondary lithium battery module.

Referring to FIG. 3, a plurality of secondary lithium unit-batteries 10 are aligned in parallel to each other in such a manner that anode terminals 10a and cathode terminals 10b thereof are alternately aligned. The anode terminals 10a and cathode terminals 10b of the secondary lithium unit-batteries 10 are positioned in recesses of receiving unit-modules 20, respectively.

Since receiving unit-modules 20, which are adjacent to each other, are coupled to each other, a receiving hole is formed in the receiving module by means of two neighboring recesses of the neighboring receiving unit-modules coupled to each other and a recess is formed at both side ends of the receiving module. The metal block 30 and the modified metal block 30' are positioned in the receiving hole and the recesses formed at both side ends of the receiving module, respectively.

The circuit board 40 having the shape corresponding to the shape of the receiving module is aligned on the receiving module in such a manner that conductive plates 35 and 35' of the metal blocks 30 and 30' make contact with the copper wirings 45 of the circuit board 40.

The anode and cathode terminals 10a and 10b of secondary lithium unit-batteries, which are adjacent to each other, the receiving module, and the metal blocks 30 and 30' are assembled with each other by means of the coupling member 50, such as a bolt.

Hereinafter, assembling work for the secondary lithium battery module according to the present invention will be described.

Firstly, a plurality of secondary lithium unit-batteries are aligned in parallel to each other such that anode and cathode terminals thereof are alternately arranged.

After that, a plurality of receiving unit-modules 20 and 20', each of which has recesses opened in opposition to each other, are coupled to each other such that the recesses of receiving unit-module 20 may match with the neighboring recesses of the neighboring receiving unit-module 20', thereby forming the receiving module. Accordingly, receiving holes are formed in the receiving module by means of the neighboring recesses of the neighboring receiving unit-modules coupled to each other and a recess is formed at both side ends of the receiving module.

Then, the receiving module is aligned such that anode and cathode terminals of the secondary lithium unit-batteries are accommodated in the receiving holes and the recesses formed at both side ends of the receiving module. In this state, the circuit board 40 is positioned on the receiving module.

Thereafter, the metal blocks are accommodated in the receiving holes of the receiving module and the circuit board formed on the receiving module and the recesses formed at both side ends of the receiving module in such a manner that the conductive plates of the metal blocks make contact with copper wirings of the circuit board. Then, the coupling member is inserted into the fixing holes of the anode and cathode terminals, receiving module and metal blocks, thereby completing assembling work for the secondary lithium battery module.

According to the secondary lithium battery module of the present invention having the above structure, a width of the secondary lithium unit-battery is substantially identical to a width of the receiving unit-module as well as a width of the receiving holes defined in the receiving module by means of two neighboring recesses of the neighboring receiving unit-modules coupled to each other, so the dimension of the secondary lithium battery module may be standardized, making the secondary lithium battery module in a compact size.

Meanwhile, a battery used in an electric vehicle requires a high-rate discharge characteristic, causing heat in the battery. When heat is generated from the battery, the life span and performance of the battery may be deteriorated. In particular, if the batteries have temperatures different from each other, the performance of each battery may vary due to the temperature deviation, thereby degrading the secondary lithium battery module or the battery pack.

If the secondary lithium battery uses the Al laminated film for the outer case thereof, heat transfer is mainly carried out between the anode terminal and the cathode terminal because of the characteristics of the outer case. For this reason, the metal block for connecting the anode and cathode terminals in series may rapidly discharge heat generated from the anode and cathode terminals to the exterior.

INDUSTRIAL APPLICABILITY

As can be seen from the foregoing, the secondary lithium battery module according to the present invention can reduce the volume and weigh thereof and rapidly discharge heat generated from the secondary lithium unit-batteries while minimizing contact resistance derived from the connection between secondary lithium batteries, so that energy density of the secondary lithium battery module can be improved and degradation of the secondary lithium battery module caused by the temperature deviation between the secondary lithium unit-batteries can be minimized. In addition, the secondary lithium battery module of the present invention can be easily fabricated without requiring a wiring for checking battery voltage, so an external appearance of the secondary lithium battery module can be improved.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A secondary lithium battery module comprising:
a plurality of secondary lithium unit-batteries including anode and cathode terminals having a hole, which terminals are protruded in one direction in parallel to each other and alternately aligned;
a receiving module having a plurality of non-metallic receiving unit-modules, each unit-module having recesses for receiving the anode and cathode terminals of the secondary lithium unit-batteries therein, each recess having a fixing hole;
a metal block having a fixing hole and a contact plate and aligned in the recesses of the receiving unit-modules such that the metal block makes contact with at least one of the anode and cathode terminals of the secondary lithium unit-batteries accommodated in the recesses of the receiving unit-modules;
a circuit board having a shape corresponding to a shape of the receiving module and aligned on an upper surface of the receiving module, the circuit board having recesses corresponding to the recesses of the receiving module and copper wirings formed at lateral portions of the recesses in order to make contact with the contact plate of the metal block; and
a coupling member inserted into the recesses of the receiving module, the anode and cathode terminals of the secondary lithium unit-batteries accommodated in the recesses, and the fixing hole of the metal block making contact with at least one of the anode and cathode terminals so as to fixedly assemble the receiving module, secondary lithium unit-batteries and the metal block with each other.

2. The secondary lithium battery module as claimed in claim 1, wherein the receiving unit-module has two recesses opened in opposition to each other for receiving the anode and cathode terminals of the secondary lithium unit-battery, respectively, and a receiving hole is formed in the receiving module by a connection between the neighboring recesses of the neighboring receiving unit-modules coupled to each other when the receiving unit-module is coupled to an adjacent one.

3. The secondary lithium battery module as claimed in claim 1, wherein a width of the secondary lithium unit-battery is substantially identical to a width of the receiving unit-module and a width of the receiving hole defined in the receiving module by a connection between the neighboring recesses of the neighboring receiving unit-modules.

4. The secondary lithium battery module as claimed in claim 1, wherein the metal block is composed of one selected from the group consisting of copper, aluminum, a copper alloy and an aluminum alloy.

5. The secondary lithium battery module as claimed in claim 1, wherein the coupling member includes a non-metallic bolt member.

6. The secondary lithium battery module as claimed in claim 1, wherein the contact plate protruding from the metal block is welded to the copper wirings of the circuit board.

7. The secondary lithium battery module as claimed in claim 1, wherein the contact plate protruding from the metal block is fixed to the copper wirings of the circuit board by means of a clamp.

8. The secondary lithium battery module as claimed in claim 2, wherein a width of the secondary lithium unit-battery is substantially identical to a width of the receiving unit-module and a width of the receiving hole defined in the receiving module by a connection between the neighboring recesses of the neighboring receiving unit-modules.

9. The secondary lithium battery module as claimed in claim 2, wherein the metal block is composed of one selected from the group consisting of copper, aluminum, a copper alloy and an aluminum alloy.

10. The secondary lithium battery module as claimed in claim 2, wherein the coupling member includes a non-metallic bolt member.

11. The secondary lithium battery module as claimed in claim 2, wherein the contact plate protruding from the metal block is welded to the copper wirings of the circuit board.

12. The secondary lithium battery module as claimed in claim 2, wherein the contact plate protruding from the metal block is fixed to the copper wirings of the circuit board by means of a clamp.

* * * * *